Patented Feb. 11, 1936

2,030,070

UNITED STATES PATENT OFFICE 2,030,070

MANUFACTURE OF ACETYLENE

Jacque C. Morrell, Chicago, Ill., assignor to Universal Oil Products Company, Chicago, Ill., a corporation of Delaware No Drawing. Application May 10, 1934, Serial No. 724,919

15 Claims. (Cl. 260—170)

The invention relates more particularly to a process for producing high yields of acetylene by the pyrolysis or cracking of hydrocarbon gases, and at the same time producing high yields of liquid polymers suitable for solvents and high anti-knock motor fuel, particularly those hydrocarbon gases arising from gasoline stabilizing plants and containing substantial percentages of 3, 4 and 5 carbon atom hydrocarbons.

Acetylene is used in large quantities in welding and heat-treating processes, as an illuminating gas and as a base for the manufacture of the various organic compounds by synthetic reactions. Thus, it can be used to make ethylene and ethane by the successive addition of hydrogen molecules in the presence of catalysts, and by proper use of halogens or halogen acids may be used to manufacture such compounds as dichlor or tetrachlor ethane. It unites with water in the presence of mercuric bromide and other salts to form aldehyde and gives substantial yields of acetic acid when passed through a caustic potash solution mixed with air in diffused daylight. The polymerization of acetylene at red heat forms benzol which is a compound of high anti-knock value when used as a motor fuel and which is the base for a large number of important industrial products.

At the present time the processes for the commercial production of acetylene are confined principally to its manufacture from calcium carbide and water, the carbide in turn being prepared by the interaction of coal or coke with lime at high temperatures in electric furnaces. The present process starts with material which is available in relatively large quantity as a by-product of petroleum refining and particularly oil cracking operations, and comprises an inexpensive method for producing and augmenting the supply of acetylene.

In cracking hydrocarbon mixtures, even those of relatively narrow boiling range under given conditions of temperature, pressure and time, it is a matter of common observation that corresponding to a given equilibrium there is a considerable spread in the boiling range of the products over that of the starting material. Thus, the yield of any product such as a single chemical compound or a narrow boiling range fraction is usually low in an intensive cracking operation and best results are obtained by a cyclic process under less severe conditions with return of unconverted fractions to the heating zone.

In cracking hydrocarbon gas mixtures of the type amenable to treatment by the present process the range in both boiling points and degree of unsaturation of the products is generally quite considerable. There are ordinarily produced acetylene, ethylene, propylene, butylenes and higher molecular weight olefins in proportions depending upon the intensity of the cracking conditions and particularly upon the temperature which, as it increases, gives increasing yields of acetylene and decreasing yields of ethylene and its higher homologs. However, when using increasing temperatures in a single stage process, there is an attendant increase in gas loss so that the possible ultimate yields of acetylene are somewhat limited. Furthermore, carbon troubles may become serious after a certain temperature is exceeded.

In one specific embodiment the present invention comprises the production of acetylene from hydrocarbon gas mixtures in three steps as follows:

1. Pyrolysis of the gases at temperatures within the approximate range of 800 to 1200° C., subatmospheric pressure and time factors of less than 0.10 second to produce high yields of ethylene;

2. Removal of olefins of higher molecular weight than ethylene by polymerization or alkylation in contact with catalysts;

3. Further pyrolysis of the residual gases at temperatures above 1100° C., subatmospheric pressures and time factors below 0.10 second to produce acetylene.

The following data are adduced to show the effect of temperature in the production of ethylene and its homologs in the first step of the process. Operations were conducted at an absolute pressure of 50 mm. of mercury and temperatures and times indicated. The analysis of the gas cracked, which was produced as a by-product in an oil cracking process, is given below:

|  | Volume percent |
|---|---|
| Acetylene | 0.4 |
| Ethylene | 4.6 |
| Propylene | 5.4 |
| i-butene | 2.9 |
| 1,3 butadiene | 4.3 |
| Methane | 26.6 |
| Ethane | 21.1 |
| Propane | 16.3 |
| n-butane | 1.5 |
| i-butane | 0.8 |
| n-pentane | 1.9 |
| i-pentane | 1.7 |
| Hydrogen | 5.8 |
| Carbon monoxide | 0.5 |
| Carbon dioxide | 1.5 |
| Nitrogen | 4.7 |
|  | 100.0 |

The following table shows the results of the primary cracking and shows that, in the case of the gas whose analysis is shown above, the maximum yield of ethylene was obtained at 1100° C.

at a time factor of a little less than 0.01 second.

| Temperature °C. | Maximum liters of hydrocarbons from 100 liters of gas | | Contact time in seconds at maximum yield |
|---|---|---|---|
| | Propylene | Ethylene | |
| 1400 | 0.96 | 10.5 | 0.0050 |
| 1300 | 2.4 | 24.8 | 0.0058 |
| 1200 | 2.8 | 31.5 | 0.0065 |
| 1100 | 7.4 | 41.8 | 0.0074 |
| 1000 | 10.9 | 29.6 | 0.0085 |

Additional investigation was conducted to verify the optimum operating conditions for the production of maximum amounts of ethylene. This work again established the fact, as shown in the following table, that a maximum amount of ethylene was produced at 1100° C. and a minimum at 1400° C. To establish conditions for the production of maximum yields of ethylene tests were conducted at the lower temperature of 1000° C. The yield of ethylene fell off considerably from the maximum produced at 1100° C. At the same time it was observed that the yield of propylene at 1000° C., was highest for the range of temperatures at which the work was conducted. This leads to the deduction that, for the production of higher olefins of the series when cracking at the same sub-atmospheric pressures and time intervals, increasing yields are produced at decreasing temperatures. Aside from the foregoing deduction the work shows conclusively that the optimum conditions for maximum yields of ethylene comprise subatmospheric pressures, periods of time less than $\frac{1}{10}$ of a second and temperatures ranging from about 1050 to 1150° C.

| Temperature °C. | Maximum liters of ethylene from 100 liters of gas | Contact time in seconds at maximum yield |
|---|---|---|
| 1400 | 21.5 | 0.008 |
| 1100 | 40.5 | 0.007 |
| 1000 | 29.5 | 0.009 |

After the primary pyrolytic treatment the gases are preferably quickly cooled and any tarry or resinous products are separated by cooling or by passage of the gases through filtering or absorbing material. Since the second stage of polymerizing the olefins of higher molecular weight than ethylene may be carried out at temperatures above atmospheric, it may not be necessary to cool the gases below this point unless the gases are to be stored preliminary to the next step.

The efficiency of the present process is to a large extent due to the fact that there are relatively high percentages of ethylene in the residual gases after the second or polymerizing step, this percentage having been increased by the selective removal of the higher molecular weight olefins. A number of polymerizing agents may be used to effect the removal of the higher olefins such as propylene, butylenes, amylenes, etcetera, but it is generally most advantageous in connection with oil refining operations to employ catalysts which produce maximum yields of gasoline boiling range hydrocarbons. Catalysts suitable for this purpose are sulfuric and phosphoric acids and mixtures thereof and also solid composites made by incorporating liquid phosphoric acids with absorbent materials such as kieselguhr and igniting at controlled temperatures to increase their activity. It is probable that in the ignition step meta and pyrophosphoric acids are formed to some extent from the ortho acid.

Taking liquid orthophosphoric acid as an example of a catalytic material suitable for the selective removal of olefins of a higher molecular weight than ethylene, the gases may be contacted therewith in any convenient manner such as, for example, bubbling through stationary pools of the acid, passing countercurrently against descending streams of acid in treating towers or by heating in closed bombs at superatmospheric pressure although the last named is essentially a batch operation and is usually not the most economical from a commercial standpoint. When using granulated solid catalysts such as infusorial earth containing phosphoric acid, particularly ortho and pyro phosphoric acids, these may be used as a filler in treating towers and the gases passed upwardly therethrough, the gases either being preheated to a suitable temperature for effecting best results or the treating chambers exteriorly heated. Temperatures favorable to the production of dimers and trimers of the 3, 4 and 5 carbon atom mono olefins include those up to about 400° F., higher temperatures tending to increase the yield of higher boiling polymers which boil above the range required in commercial motor fuel.

If desired, the removal of the ethylene homologs may be made by anhydrous salts such as aluminum chloride or by solutions of such salts as zinc chloride. Sulfuric acid may also be employed although the tendency to ester formation is greater and also the tendency toward the formation of higher boiling polymers. By proper manipulation when considering the polymerizing ability of the various agents which may be employed the higher molecular weight olefins may be separately removed as a liquid without substantially affecting the ethylene which probably acts as the principal starting material for the formation of acetylene by dehydrogenation in the third step of the process.

Alternatively with the removal of the higher molecular weight olefins by direct polymerization they may be caused to alkylate cyclic hydrocarbons such as benzol and its homologs, using the same general classes of catalysts enumerated in connection with their polymerization. This method is substantially just as effective as polymerizing for the selective removal of the higher olefins, since ethylene has the smallest tendency of any of the olefins to enter into combination with cyclic compounds, and conditions and catalysts may be chosen so that it is substantially unaffected.

In the third stage of the process the residual gases from the second stage are resubjected to pyrolysis under temperatures most favorable to the production of acetylene from the gas mixture obtained at this point. As previously indicated the most favorable temperatures are those above 1100° C., the optimum depending upon the composition of the original gas mixture and the efficiency of the first two stages of the process. The low subatmospheric pressures are again preferred and also the low time factors which are of the same general order as those employed in the primary pyrolytic step. The procedure is generally the same as that employed in the primary step except that more care needs to be exercised in the selection of refractory material to withstand the higher temperatures used, suitable materials being fireclay, silica, Sillimanite, etcetera.

The following table is introduced to show the influence of temperature on the yield of acetylene in the third stage of the process:

| Temperature °C. | Maximum liters of acetylene from 100 liters of original gas | Seconds time at maximum yield |
|---|---|---|
| 1400 | 42.0 | 0.005 |
| 1300 | 25.2 | 0.0058 |
| 1200 | 14.9 | 0.0065 |
| 1100 | 7.0 | 0.0074 |

Consideration of the above data indicates that the maximum temperature of 1400° C. in the range employed produced the maximum yield of acetylene and that decreasing temperatures decreased the yield. The time factors employed will be seen to be of the same order as those employed in the primary step and small in comparison to time factors frequently employed in the pyrolytic treatment of hydrocarbon gas mixtures for the same object. The use of the low time factor corresponds to a high yield of acetylene for a given size of equipment.

The invention is not limited to the use of any particular type of gas cracking apparatus in the primary and final stages and the exact design and capacity of the primary and final cracking units will be varied to suit the needs of any particular case. The materials used in constructing apparatus in which these steps are conducted will be determined to some extent by the temperatures employed, tubes of high chromium steel and other high melting alloys being utilized at the lower ranges while tubes of refractory materials such as fire clay, silica, Sillimanite, etcetera, are best employed at the higher temperatures which approach the fusing point of iron.

The gas cracking zones of the process are preferably designed to permit accurate control of time factor and in most cases will consist of tubes of relatively small capacity through which the gas mixtures are pumped at accurately controlled rates. The tubes may be heated by any suitable source of heat such as ordinary flames or hot combustion gases, and electrical resistors may be used with due consideration of the cost factor involved. The gases may be preheated before passage through the reaction zones to some point under the critical conditions necessary for best results, this preheating involving the use of ordinary steel tubular heating elements heated by combustion gases.

The following example summarizes the results obtainable in commercial operation operating upon a gas of the following average composition:

*Composition of original gas mixture*

| | Per cent |
|---|---|
| Hydrogen | 5 |
| Methane | 25 |
| Ethane | 23 |
| Propane | 18 |
| Ethylene | 6 |
| Propylene | 7 |
| Butanes | 6 |
| Butenes | 4 |
| Pentanes and heavier | 6 |

The above gas mixture representing a mixed stabilizer gas from a commercial refinery operation was cracked at a temperature of 900° C., an absolute pressure of 50 mm. of mercury and a time of approximately 0.01 second. The gas produced contained 25% ethylene and 16% of propylene and higher mono olefines. This gas mixture was passed downwardly through a mass of solid phosphoric acid catalyst (made by incorporating 80% by weight of 90% orthophosphoric acid with kieselguhr) at a temperature of 400° F. and a pressure of 100 pounds per square inch. There were produced by this operation 3 gallons of gasoline boiling range liquids for each 1000 cubic feet of gas mixture treated. The properties of the liquids produced are given in the following table:

*Properties of gasoline hydrocarbons*

| | |
|---|---|
| Gravity, °A. P. I. | 66.0 |
| Initial boiling point | 100° F. |
| 50% over at | 260° F. |
| 90% over at | 435° F. |
| End boiling point | 470° F. |
| Color, Saybolt | 25 |
| Mg. of gum by copper dish | 30 |
| Blending octane number, research method | 110 |

The residual gas having then an ethylene content of 30% was subjected to cracking conditions corresponding to a temperature of 1400° C., a pressure of 50 mm. of mercury absolute and a time of 0.06 second at the temperature and pressure indicated. The final yield of acetylene from 100 liters of the original gas was 45 liters.

The manner in which the present process is differentiated from the existing processes concerned with the manufacture of acetylene is evident from the preceding specification and the yields obtainable are generally indicated by the data given when employing a commercial hydrocarbon gas mixture. However, the invention is not to be limited strictly to the details of the disclosure nor to the numerical data presented.

I claim as my invention:

1. A process for the production of acetylene and liquid hydrocarbons from hydrocarbon gases, which comprises subjecting said gases to an elevated temperature in the range of 800° to 1200° C. to produce high yields of olefin hydrocarbons, comprising ethylene, separating from the resulting product olefins higher in molecular weight than ethylene by conversion thereof into liquid hydrocarbons and separating the resulting liquid product, and thereafter subjecting the residual gases containing ethylene to a temperature above 1100° C. to convert the same into substantial yields of acetylene.

2. A process for the production of acetylene and liquid hydrocarbons from hydrocarbon gases, which comprises subjecting said gases to an elevated temperature in the range of 800° to 1200° C. under a subatmospheric pressure and for a time factor of less than 0.1 second, to produce high yields of olefin hydrocarbons comprising ethylene, separating olefins of higher molecular weight than ethylene from the resultant product by conversion thereof into liquid hydrocarbons and recovering the latter, and thereafter subjecting the residual gases containing ethylene to a temperature above 1100° C. to convert the same into substantial yields of acetylene.

3. A process for the production of acetylene and liquid hydrocarbons from hydrocarbon gases, which comprises subjecting said gases to an elevated temperature in the range of 800° to 1200°

C. for a time factor of less than 0.1 second to produce high yields of olefin hydrocarbons comprising ethylene, subjecting the resulting product containing said olefin hydrocarbons to the action of a polymerizing agent capable of polymerizing olefins higher in molecular weight than ethylene and separating the resulting liquid product, and thereafter subjecting the residual gases containing ethylene to a temperature above 1100° C. to convert the same into substantial yields of acetylene.

4. A process for the production of acetylene and liquid hydrocarbons from hydrocarbon gases, which comprises subjecting said gases to an elevated temperature in the range of 800° to 1200° C., under a subatmospheric pressure and for a time factor of less than 0.1 second, to produce high yields of olefin hydrocarbons comprising ethylene, subjecting the resulting product containing said olefin hydrocarbons to the action of a polymerizing agent capable of polymerizing olefins higher in molecular weight than ethylene and separating the resulting liquid product, and thereafter subjecting the residual gases containing ethylene to a temperature above 1100° C. to convert the same into substantial yields of acetylene.

5. A process for the production of acetylene and liquid hydrocarbons from hydrocarbon gases, which comprises subjecting said gases to an elevated temperature in the range of 800° to 1200° C. under a subatmospheric pressure and for a time factor of less than 0.1 second, to produce high yields of olefin hydrocarbons comprising ethylene, subjecting the resulting product containing said olefin hydrocarbons to the action of a polymerizing agent comprising a phosphoric acid capable of polymerizing olefins higher in molecular weight than ethylene and separating the resulting liquid product, and thereafter subjecting the residual gases containing ethylene to a temperature above 1100° C. to convert the same into substantial yields of acetylene.

6. A process for the production of acetylene and liquid hydrocarbons from hydrocarbon gases, which comprises subjecting said gases to an elevated temperature in the range of 800° to 1200° C. under a subatmospheric pressure and for a time factor of less than 0.1 second, to produce high yields of olefin hydrocarbons comprising ethylene, subjecting the resulting product containing said olefin hydrocarbons to the action of a polymerizing agent comprising ortho-phosphoric acid capable of polymerizing olefins higher in molecular weight than ethylene and separating the resulting liquid product, and thereafter subjecting the residual gases containing ethylene to a temperature above 1100° C. to convert the same into substantial yields of acetylene.

7. A process for the production of acetylene and liquid hydrocarbons from hydrocarbon gases, which comprises subjecting said gases to an elevated temperature in the range of 800° to 1200° C. under a subatmospheric pressure and for a time factor of less than 0.1 second, to produce high yields of olefin hydrocarbons comprising ethylene, subjecting the resulting product containing said olefin hydrocarbons to the action of a polymerizing agent comprising pyro-phosphoric acid capable of polymerizing olefins higher in molecular weight than ethylene and separating the resulting liquid product, and thereafter subjecting the residual gases containing ethylene to a temperature above 1100° C. to convert the same into substantial yields of acetylene.

8. A process for the production of acetylene and liquid hydrocarbons from hydrocarbon gases, which comprises subjecting said gases to an elevated temperature in the range of 800° to 1200° C. under a subatmospheric pressure and for a time factor of less than 0.1 second, to produce high yields of olefin hydrocarbons comprising ethylene, subjecting the resulting product containing said olefin hydrocarbons to the action of a polymerizing agent comprising a phosphoric acid capable of polymerizing olefins higher in molecular weight than ethylene and separating the resulting liquid product, and thereafter subjecting the residual gases containing ethylene to a temperature above 1100° C. and under subatmospheric pressure to convert the same into substantial yields of acetylene.

9. A process for the production of acetylene and liquid hydrocarbons from hydrocarbon gases, which comprises subjecting the said gases to an elevated temperature in the range of 800° to 1200° C. under a subatmospheric pressure and for a time factor of less than 0.1 second, to produce high yields of olefin hydrocarbons, subjecting the resulting product containing the said olefin hydrocarbons to the action of a polymerizing agent comprising a phosphoric acid capable of polymerizing olefins higher in molecular weight than ethylene and separating the resulting liquid product, and thereafter subjecting the residual gases containing ethylene to a temperature above 1100° C. and under subatmospheric pressure and for a time factor of less than 0.1 second to convert the same into substantial yields of acetylene.

10. A process for the treatment of hydrocarbon gases to produce high yields of acetylene and liquid hydrocarbons, which comprises subjecting the said hydrocarbon gases to an elevated temperature within the approximate range of 800–1200° C. and for a time factor of less than 0.1 second, subjecting the resulting product containing olefin hydrocarbons comprising ethylene to the action of an alkylating agent and a cyclic hydrocarbon and reacting the latter with olefins higher in molecular weight than ethylene to form liquid hydrocarbons, separating the resulting liquid products and subjecting the residual gaseous hydrocarbons containing ethylene to a temperature above 1100° C. for a time factor of less than 0.1 second to convert the same into substantial yields of acetylene.

11. A process for the treatment of hydrocarbon gases to produce high yields of acetylene and liquid hydrocarbons, which comprises subjecting the said hydrocarbon gases to an elevated temperature within the approximate range of 800–1200° C. under subatmospheric pressure, and for a time factor of less than 0.1 second, subjecting the resulting product containing olefin hydrocarbons comprising ethylene to the action of an alkylating agent and a cyclic hydrocarbon and reacting the latter with olefins higher in molecular weight than ethylene to form liquid hydrocarbons, separating the resulting liquid products and subjecting the residual gaseous hydrocarbons containing ethylene to a temperature above 1100° C. under subatmospheric pressure for a time factor of less than 0.1 second to convert the same into substantial yields of acetylene.

12. A process for the treatment of hydrocarbon gases to produce high yields of acetylene and liquid hydrocarbons, which comprises subjecting the said hydrocarbon gases to an elevated temperature within the approximate range of 800–

1200° C. and for a time factor of less than 0.1 second, subjecting the resulting product containing olefin hydrocarbons including ethylene to the action of a phosphoric acid and a cyclic hydrocarbon and reacting the latter with olefins higher in molecular weight than ethylene to form liquid hydrocarbons, separating the resulting liquid products and subjecting the residual gaseous hydrocarbons containing ethylene to a temperature above 1100° C. for a time factor of less than 0.1 second to convert the same into substantial yields of acetylene.

13. A process for the treatment of hydrocarbon gases to produce high yields of acetylene and liquid hydrocarbons, which comprises subjecting the said hydrocarbon gases to an elevated temperature within the approximate range of 800–1200° C. and for a time factor of less than 0.1 second, subjecting the resulting product containing olefin hydrocarbons including ethylene to the action of a mixture of phosphoric acid and a solid material in the presence of a cyclic hydrocarbon and reacting the latter with olefins higher in molecular weight than ethylene to form liquid hydrocarbons, separating the resulting liquid products and subjecting the residual gaseous hydrocarbons containing ethylene to a temperature above 1100° C. for a time factor of less than 0.1 second to convert the same into substantial yields of acetylene.

14. A process for the treatment of hydrocarbon gases to produce high yields of acetylene and liquid hydrocarbons, which comprises subjecting the said hydrocarbon gases to an elevated temperature within the approximate range of 800–1200° C. and for a time factor of less than 0.1 second, subjecting the resulting product containing olefin hydrocarbons including ethylene to the action of a mixture of phosphoric acid and a solid adsorbent material in the presence of a cyclic hydrocarbon and reacting the latter with olefins higher in molecular weight than ethylene to form liquid hydrocarbons, separating the resulting liquid products and subjecting the residual gaseous hydrocarbons containing ethylene to a temperature above 1100° C. for a time factor of less than 0.1 second to convert the same into substantial yields of acetylene.

15. A process for the treatment of hydrocarbon gases to produce high yields of acetylene and liquid hydrocarbons, which comprises subjecting the said hydrocarbon gases to an elevated temperature within the approximate range of 800–1200° C. and for a time factor of less than 0.1 second, subjecting the product containing olefin hydrocarbons including ethylene to the action of a mixture of phosphoric acid and a solid siliceous adsorbent material in the presence of a cyclic hydrocarbon and reacting the latter with olefins higher in molecular weight than ethylene to form liquid hydrocarbons, separating the resulting liquid products and subjecting the residual gaseous hydrocarbons containing ethylene to a temperature above 1100° C. for a time factor of less than 0.1 second to convert the same into substantial yields of acetylene.

JACQUE C. MORRELL.